United States Patent Office 3,355,370
Patented Nov. 28, 1967

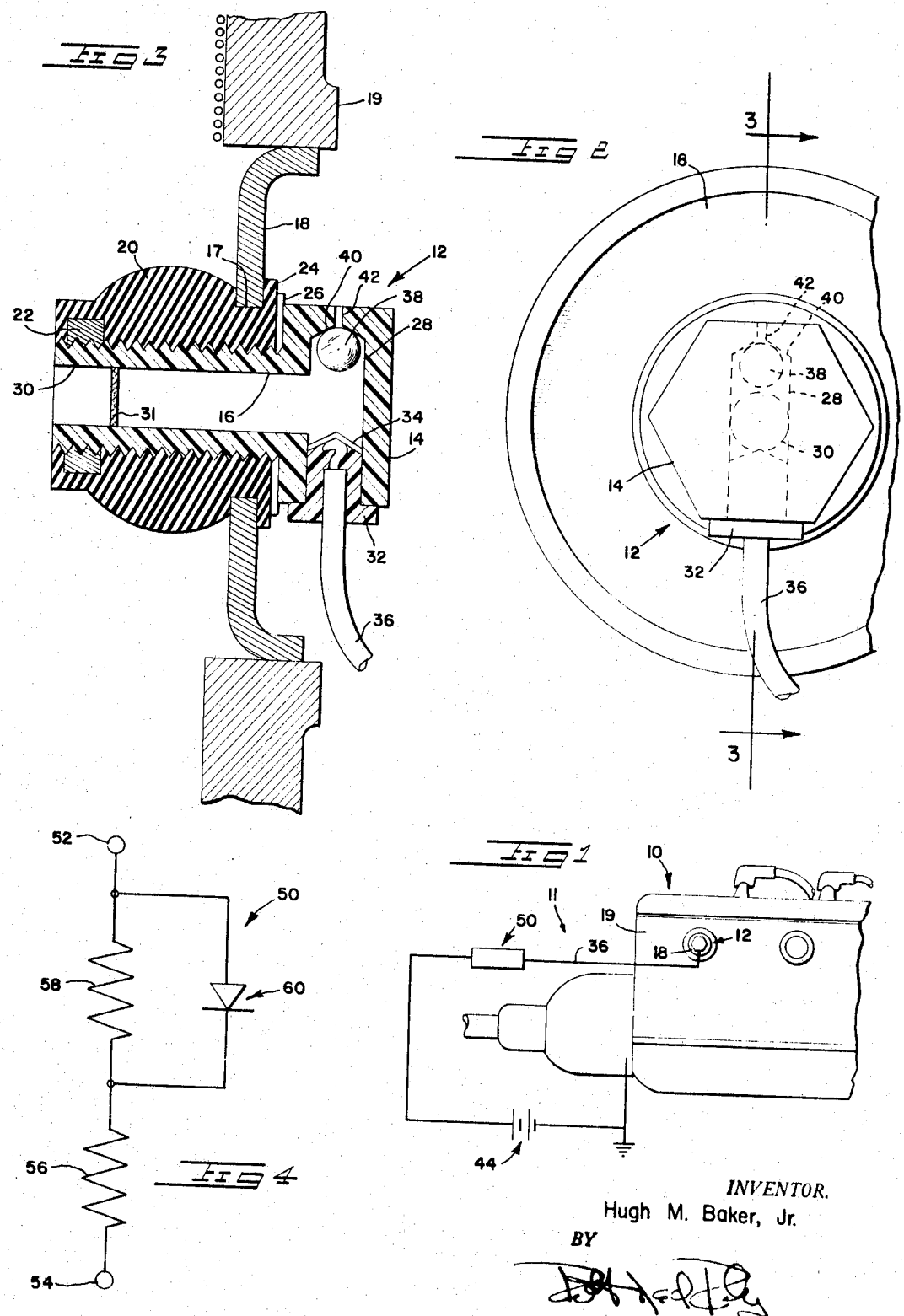

3,355,370
CATHODIC PROTECTION METHOD AND APPARATUS
Hugh M. Baker, Jr., Washington, D.C. (620 Baltimore-Annapolis Blvd., Glen Burnie, Md. 21061)
Filed Jan. 15, 1964, Ser. No. 337,791
2 Claims. (Cl. 204—147)

ABSTRACT OF THE DISCLOSURE

This invention relates to methods and apparatus for inhibition of metal corrosion in saline environments. A negative potential is applied to the container thereby forming hydrogen bubbles adjacent the container for precluding substantial contact between the saline solution in the container. An insulated anode is provided which generates gaseous material of which a large portion is chlorine. Since free chlorine is soluble in a saline solution, the chlorine bubbles are vented to the atmosphere by a one-way valve. A suitable filtering means is disclosed between the chambered anode and the interior of the container for filtering out solid particles from the saline solutions as it passes toward the anode and for precluding movement of chlorine into the interior of the container. In the circuit for applying the potential, resistor means comprising a resistor in parallel with a diode and means for reversing the connections of the resistor means are provided to compensate for two different values of the source of the applied potential to maintain the current constant.

---

This invention relates to a method and apparatus for inhibiting corrosive action within a container formed of electrically conductive material adapted to contain saline type solution wherein the wall portions of the container which are in contact with the saline solution are subject to corrosion therefrom.

As merely illustrative of one type of container and desirable environment to which the invention may apply the subject inventive concept is herein disclosed, described, illustrated and shown in conjunction with the water jacket cooling system of a marine engine.

However, it is to be understood that the invention is as equally applicable to other types of containers such as liquid containing towers, tanks, drums, pipes, etc. in which or through which a saline solution, whether ordinary sea water or a pharmaceutical solution is contained therein or flows there-through.

It is also to be understood that the invention is equally applicable to other types of fluids where the advantages of the invention are desirable.

Some marine engines are cooled with a closed system wherein the water jacket of the engine is connected to a heat exchanger which extends through the hull of the vessel through which the cooling water is circulated. In the closed type of system a relatively non-corrosive heat transfer medium is circulated within the water jacket of the engine and the heat exchanger and therefore the corrosive sea water never comes in contact with the water jacket. Other machine type engines cool directly with corrosive sea water by circulating the sea water itself through the cooling system of the engine.

Both of these methods have obvious "disadvantages." The closed system, described above, is necessarily more expensive since a heat exchanger is required and this in itself is an additional maintenance problem. Moreover the heat exchanger, being typically mounted on the hull of the vessel, is not only easily damaged but also adversely affects the speed of the craft. Circulating the corrosive sea water through the engine is of course much less expensive but in this type of cooling system there is normally little or no protection at all given to the engine from the corrosive action created by the sea water.

Also, attempts have been made to inhibit corrosion in marine engines by supplying an additive to the sea water used for cooling the engine. This, of course, requires a periodic replacement of the additive and is therefore undesirable.

It is therefore an object of the invention to provide a simple method and apparatus for protecting a container formed of electrically conductive and corrosive material having surfaces exposed to and subject to the corrosive action of a saline solution therein by producing a thin isolating film of hydrogen gas on the surfaces of the container subject to such corrosion.

A further object of this invention is to provide a simple and inexpensive method and apparatus which will safely allow the cooling of a marine engine with sea or other saline water by inhibiting corrosive action by the saline water within the cooling system.

A further object of the invention is to provide a method of protecting the cooling system of a marine engine from corrosion by producing a thin film of non-corrosive hydrogen on the interior surfaces of the cooling system exposed to saline sea water by a polarizing technique to thereby insulate and isolate such surfaces from contact with saline sea water.

Another object of the invention is to vent to atmosphere corrosive gases which are also necessarily created at a cathodic electrode which is used to create a thin film of hydrogen on inner surfaces of a metal or like container in contact with a saline solution disposed in the container.

An additional object of this invention is to provide a corrosion inhibiting apparatus that can be installed on any internal combustion or other type of engine utilizing a water jacket in which corrosive saline water is used for cooling purposes.

A still further object of this invention is to provide electrically activated corrosion inhibiting apparatus for water jacketed marine engines utilizing saline water for engine cooling wherein the corrosion inhibiting apparatus is inherently self-adaptable for use with different standard voltage electrical systems.

A yet still further object of this invention is to provide electrically activated corrosion inhibiting apparatus for water-jacketed marine engines utilizing saline water for engine cooling wherein the corrosion inhibiting apparatus is inherently self-adaptable for use with conventional engine electrical systems of the 6 volt or 12 volt type.

Other objects, advantages and important features of the invention will be apparent from a study of the specification following, taken with the drawing, which together describe, disclose, illustrate and show a preferred embodiment of the invention and what is now considered and believed to be the best method of practicing the principles thereof. Still other embodiments, modifications, procedures or equivalents may be subject to those having the benefit of the teaching herein and such other embodiments, modifications, procedures or equivalents are intended to be reserved especially if they fall within the scope and breadth of the subjoined claims.

In the drawing:

FIGURE 1 is a partial side elevational view of a marine engine having a cooling water jacket with the preferred embodiment of a corrosion inhibiting apparatus mounted thereon and showing diagrammatically the electrical circuit involved therewith;

FIGURE 2 is an enlarged partial elevational view of the corrosion inhibiting unit of the apparatus that is used with the engine cooling water jacket of the marine engine illustrated in FIGURE 1;

FIGURE 3 is a side elevational sectional view taken along the line 3—3 of FIGURE 2, looking in the direction of the arrows, and FIGURE 4 is a schematic diagram of a portion of the electrical circuit used showing a compensator unit for adapting the invention for installation with different electrical systems, such as either a 6 volt or 12 volt system.

Attention is now directed to the drawing wherein there is shown a container 10 in which there is confined, contained or at least partially enclosed, a saline solution W with the container 10 being provided with a corrosive inhibitor apparatus 11 for inhibiting corrosive action of the saline solution W on the portions of the container 10 which are formed of an electrically conductive material and which are in contact with the saline solution W.

In the preferred embodiment of this invention, as illustrated in FIGURE 1 of the drawing, the container 10 is illustrated and shall be described and disclosed herein as a marine type engine with the saline solution W being sea water which is employed for cooling the marine engine 10.

It is to be understood that the method and apparatus of this invention is equally effective and applicable to other types of containers than engines. Such other containers being towers which may contain a supply of sea water for fire protection, tanks, drums, pipes, etc. or the like in which a saline solution is in contact with at least a portion of the container and that the saline solution W need not necessarily be sea water and might possibly be some type of pharmaceutical or chemical solution which would have corrosive effect on the material of a container in which the solution is stored or otherwise confined.

In order to protect the wall portions of the engine 10 which are in contact with the sea water W from the corrosive action thereof the container 10 is provided with the corrosive inhibitor apparatus 11 which comprises a hollow bolt like device 12 constructed of nylon or like non-conducting and non-corrosive material having a hex head portion or member 14 and a threaded stem portion or member 16. The threaded stem portion 16 of the device 12 is secured in a mounting member 18 such as a freeze plug of the engine 10 and is secured in the engine water jacket 19 by means of a rubber expanding gasket 20. The rubber gasket 20 has at the inner end portion thereof a nut 22, which threadedly engages the threaded stem portion 16 of the device 12 and at the outer end portion a flanged or shouldered part 24. A washer 26 is mounted on the stem 16 between the flanged part 24 and the hex head 14 of the device 12. The rubber gasket 20 is expanded into sealing relationship with the stem 16 and the mounting member 18 by the threaded engagement of the stem 16 with the nut 22. By rotating the stem 16 by means of the hex head 14 the advance of the nut 22 along the stem portion 16 squeezes and expands the gasket 20, between the nut 22 and the gasket flange part 24, into tight sealing engagement with the mounting member 18.

The hex head portion 14 of the device 12 has a transversely disposed elongate passageway extending therethrough for defining valve chamber 28 therein which is normally positioned generally vertical, as illustrated, with the valve chamber 28 communicating with a generally longitudinally extending passageway 30 in the stem portion 16 of the device 12 wherein there is provided filtering means 31 preferably formed of a material such as fibre glass which is chemically unaffected by gases such as chlorine.

An insulating closure member 32, comprised of nylon or the like, closes the lower end of the valve chamber 28 which has mounted adjacent the upper end portion thereof an electrical contact element or electrode 34, formed of a noble metal such as platinum, rhodium, or the like. An insulated electrical conductor 36 is connected to an electrical compensating circuit 50 which extends through the closure 32 into the electrical connection with the platinum electrode 34. A floatable ball valve element 38, formed, for example, as a hollow glass bead or the like, is engageable with a tapered or conical valve seat 40 formed at the upper end portion of the valve chamber 28 for controlling a vent orifice or restricted passage 42 leading from the valve chamber 28 to atmosphere. The degree of taper of the valve seat 40 for the floatable ball valve element 38 is such that engagement of the valve element 38 with the seat 40, effected by the sea water W used to cool the engine, will prevent escape of the latter through the orifice 42.

The negative pole of a battery 44 is connected to the water jacket 19 thus establishing the engine as a cathode and the positive pole is connected to the platinum electrode 34 which forms an anode. The compensator circuit 50, described hereinafter, is connected between the positive pole of the battery 44 and the anode 34.

In operation, sufficient electrical potential is impressed between the anode 34 and the electrically conductive portions of the engine 10, such as the water jacket 19 to effect electrolysis of the sea water in the cooling system. As electrolysis proceeds, the non-corrosive hydrogen gas H of the sea water W forms as a thin film of very small bubbles over the cathodic water jacket walls and thereby isolates the wall portions of the engine 10 from the corrosive action of the saline or sea water W. Inasmuch as the film of the hydrogen gas bubbles H also acts as an insulator, after electrolysis has coated substantially the entire surface of the water jacket 19 the current being drawn from the battery 44 is negligible. Due to the small size of the hydrogen bubbles they tend to adhere to the surface of the wall portions of the engine 10. However, if any of the hydrogen gas bubbles H escape, they are replaced in a short time as current is allowed to pass through the void. It should be noted that even in the absence of a bubble, or bubbles, of hydrogen on a given area; such area has cathodic protection. The presence of the thin film of the hydrogen bubbles H is twofold; it affords protection against the corrosive action of saline sea water W and electrically insulates the water jacket 19 and the wall portions of the engine 10 from the sea water to thereby reduce the current demand on the battery 44 to almost zero.

At the anode 34, gases G indusive of creating corrosive action, such as chlorine, will be liberated. The gases G will rise and collect around the hollow floatable ball valve element 38 in the upper portion of the passageway 28 in the hex head member 14 since the ball valve element 38 co-operates with the seat 40 to effect a seal. As the gases G collect, the level of the water surrounding the floating ball valve element 38 will be depressed. When the water level is sufficiently depressed, the valve element 38 will drop from engagement with the seat 40 and the liberated gases G including the chlorine will escape to the atmosphere through the restricted orifice 42 until the water rises and again forces the ball valve element 38 into sealing engagement with the valve seat 40.

In FIGURE 4 of the drawing, the voltage compensating electronic circuit 50 is shown as being capable of adapting the corrosion inhibitor apparatus 11 for use with electrical systems of different voltages such as for example either of the well known 6 volt or 12 volt systems. The compensator circuit 50 has connectors 52 and 54 that are alternatively connected to the positive pole of the battery 44 depending on whether it is, for instance, a 6 volt or 12 volt battery. The voltage electronic compensator circuit 50 has two resistors 56 and 58 of substantially equal value connected in series. A diode 60 is connected across resistance 58. With connector 52 connected to the positive pole of a 6 volt source, the resistance 58 is effectively shunted out since the diode 60 is conductive. When the connector 54 is connected to the positive pole of a 12 volt source, the diode 60 will be non-conductive and both the resistance 56 and the resistance 58 will be effective. It will be seen therefore that by merely reversing the connectors 52 and 54, the current passing through the anode will be kept the same for a 6 volt or a 12 volt system as well as other comparable electrical systems.

The entire film of hydrogen H is flushed away when the engine 10 is started and fresh sea water W enters the water jacket 19. But this is relatively unimportant as regards corrosion inhibiting since the typical pleasure craft engine is typically in operation less than 5% of its life. However, as regards the cooling function of the sea water W this flushing of the hydrogen film from the water contacting surfaces of the engine water jacket 19 is highly desirable. Its presence would otherwise tend to insulate the jacket surfaces and thereby reduce the cooling or heat exchange efficiency of the water.

While the invention has been described, disclosed, illustrated and shown in terms of a preferred embodiment which it has assumed in practice, the scope of the invention should not be deemed to be limited by the precise embodiment herein shown, described, illustrated and disclosed, such other embodiments, modifications, procedures or equivalents are intended to be reserved as they fall within the scope of the claims here appended.

I claim as my invention:

1. A method of protecting a water jacket of a water cooled engine from the corrosive effects of saline water within the water jacket which comprises, applying to the water jacket of the engine sufficient electrical potential to render same a cathode, insulatingly disposing an anode to the exterior of the water jacket in fluid communication with the interior thereof, electrolyzing any water confined to the interior of the water jacket, venting to atmosphere gases inclusive of chlorine produced at the anode while simultaneously preventing the escape of the water from the engine water jacket, providing a power source and resistor means shunted by a diode in circuit with the anode and the cathode, and compensating for two different values of said source to maintain the current between the anode and the cathode constant by reversing the electrical connections of said resistor means.

2. In combination with the water jacket of a marine engine cooled with sea water, a corrosion inhibiting device comprising a hollow member extending into the water jacket in fluid communication therewith and electrically insulated therefrom, said hollow member having an upstanding portion defining a chamber in fluid communication with said water jacket, the upper extremity of said portion terminating in an orifice vented to atmosphere, float means contained within the portion of said chamber and effective to float therein and co-operate with said orifice to effect a seal between the atmosphere and said chamber, an electric circuit having an anode disposed within said chamber and electrically insulated therefrom, a source of direct current energy having the positive pole operatively connected to said anode and the negative pole operatively connected to said water jacket, the source of direct current having sufficient potential to electrolyze the sea water, resistor means having a resistor and a diode in parallel and having input and output connections in circuit with the anode and cathode, and means for reversing the connections of said resistor means, whereby the sea water may be electrolyzed to form a thin film of hydrogen bubbles on the water contacting surfaces of the water jacket and the corrosive gases of the electrolyzed sea water are formed at the anode and then vented to atmosphere through said orifice.

References Cited

UNITED STATES PATENTS

| | | | |
|---|---|---|---|
| 2,176,514 | 10/1939 | Thomson | 204—147 |
| 2,329,961 | 9/1943 | Walker | 204—196 |
| 2,762,767 | 9/1956 | Mosher et al. | 204—147 |
| 2,826,543 | 3/1958 | Sabins | 204—197 |
| 2,976,226 | 3/1961 | Risberg | 204—147 |
| 3,079,556 | 2/1963 | Connelly et al. | 324—131 |
| 3,081,241 | 3/1963 | Smith | 204—149 |

FOREIGN PATENTS 14,818  7/1899  Great Britain.

JOHN H. MACK, *Primary Examiner.*

HOWARD S. WILLIAMS, *Examiner.*

T. TUNG, *Assistant Examiner.*